(12) United States Patent
Kaiser et al.

(10) Patent No.: US 6,618,541 B2
(45) Date of Patent: Sep. 9, 2003

(54) FIBER ARRAY FABRICATION

(75) Inventors: Geoffrey Kaiser, Holliston, MA (US); John S. Berg, Franklin, MA (US); Mark Steinback, Newton, MA (US)

(73) Assignee: Zygo Corporation, Middlefield, CT (US)

(*) Notice: Subject to any disclaimer, the term of this patent is extended or adjusted under 35 U.S.C. 154(b) by 0 days.

(21) Appl. No.: 10/098,178

(22) Filed: Mar. 14, 2002

(65) Prior Publication Data

US 2002/0131754 A1 Sep. 19, 2002

Related U.S. Application Data

(60) Provisional application No. 60/275,737, filed on Mar. 14, 2001.

(51) Int. Cl.[7] .................................................. G02B 6/00
(52) U.S. Cl. ........................................ 385/137; 385/52
(58) Field of Search ................... 385/52–94, 115–119, 385/121, 135–139

(56) References Cited

U.S. PATENT DOCUMENTS

| | | | | |
|---|---|---|---|---|
| 4,469,554 A | | 9/1984 | Turner .......................... 156/657 |
| 4,743,084 A | | 5/1988 | Manning ................... 350/96.21 |
| 4,755,019 A | | 7/1988 | Peschko et al. ........... 350/96.21 |
| 4,812,002 A | * | 3/1989 | Kato et al. ..................... 385/33 |
| 4,830,450 A | | 5/1989 | Connell et al. ............. 350/96.2 |
| 5,135,590 A | * | 8/1992 | Basavanhally et al. ........ 156/64 |
| 5,247,597 A | | 9/1993 | Blacha et al. .................. 385/88 |
| 5,259,054 A | | 11/1993 | Benzoni et al. ................. 385/89 |
| 5,483,611 A | | 1/1996 | Basavanhally ................ 385/78 |
| 5,566,262 A | * | 10/1996 | Yamane et al. ................ 385/33 |
| 5,800,666 A | | 9/1998 | Bonham, Jr. et al. ........ 156/345 |
| 5,815,621 A | * | 9/1998 | Sakai et al. .................... 385/80 |
| 5,901,262 A | * | 5/1999 | Kobayashi et al. ............ 385/89 |
| 5,907,650 A | * | 5/1999 | Sherman et al. ............... 385/80 |
| 6,072,932 A | * | 6/2000 | Bennett et al. ............... 385/139 |
| 6,253,007 B1 | * | 6/2001 | Laughlin ....................... 385/34 |
| 6,470,123 B1 | * | 10/2002 | Sherman et al. ............. 385/115 |
| 2002/0154882 A1 | * | 10/2002 | Moran ......................... 385/137 |

FOREIGN PATENT DOCUMENTS

WO    WO 02/06871 A1    1/2002   ............ G02B/6/08

OTHER PUBLICATIONS

International Search Report.

* cited by examiner

*Primary Examiner*—Akm Enayet Ullah
*Assistant Examiner*—Michelle R. Connelly-Cushwa
(74) *Attorney, Agent, or Firm*—Fish & Richardson P.C.

(57) ABSTRACT

A fiber-locating structure for aligning an optical fiber includes opposed first and second faces. A first wall, defining a funnel, extends from the first face toward the second face; while a second wall, defining a tunnel, extends from the second face toward the first face. The first and second walls are disposed such that the funnel and the tunnel meet to form a continuous passageway between the first face and the second face.

30 Claims, 8 Drawing Sheets

FIBER ARRAY FABRICATION

RELATED APPLICATIONS

This application claims the benefit of the Mar. 14, 2001 filing date of U.S. Provisional Application No. 60/275,737, entitled "Fiber Array Fabrication", the contents of which are incorporated by reference.

FIELD OF INVENTION

This invention relates to optical fibers, and in particular, to structures for supporting optical fibers.

BACKGROUND

In an optical communication system, it is sometimes necessary for a beam of light to emerge from a source fiber into free space and to later enter a destination fiber. To accomplish this, the beam of light that emerges from the source fiber must be guided across the free space so that as much light as possible from that beam enters the destination fiber. The extent to which light emerging from the source fiber fails to enter the destination fiber is referred to as the "insertion loss."

The guiding of the beam of light across free space is typically accomplished by lenses and mirrors. These optical guiding elements must be precisely aligned relative to the source fiber, the destination fiber, and to each other. The extent to which this can be achieved depends, in part, on the extent to which an optical fiber can be precisely positioned.

Because an optical fiber is flexible, precise positioning of a fiber typically requires placing the fiber in a structure that securely engages it. One such structure is a mask having precisely placed holes formed thereon. When a fiber is inserted into a hole in such a mask, the wall forming the hole engages the fiber and fixes its location.

Inserting a flexible fiber into a hole is somewhat like threading a needle. The larger the hole is relative to the fiber, the easier it is to insert the fiber into the hole. However, to the extent that the hole is larger than the fiber, the walls forming the hole are unable to engage the fiber at a precisely fixed location.

SUMMARY

The invention provides a fiber-locating structure having one or more passageways. Each passageway includes a funnel portion for receiving an optical fiber, and a tunnel portion for engaging the optical fiber. The fiber is easily inserted into the large opening of the funnel portion. The walls forming the funnel portion then guide the fiber into the narrower tunnel portion.

In one embodiment, the invention includes a fiber-locating structure having opposed first and second faces. A first wall, defining a funnel, extends from the first face toward the second face; while a second wall, defining a tunnel, extends from the second face toward the first face. The first and second walls are disposed such that the funnel and the tunnel meet to form a continuous passageway between the first face and the second face.

The tunnel portion can have any cross-section. In some embodiments, the cross-section of the tunnel portion is circular. However, the tunnel portion can also have protrusions extending radially inward and forming kinematic mounts for an optical fiber inserted therein.

In another embodiment, the invention also includes an optical fiber, such as a tapered optical fiber, extending from the first face to the second face through the funnel and the tunnel. As used herein, optical fibers are not restricted to those fibers that are intended to guide visible light.

The invention also includes a method for aligning an optical fiber by forming a funnel extending from a first face toward a second face of a fiber-locating structure and forming a tunnel extending from the second face toward the first face. The funnel and the tunnel are disposed to intersect within the interior of the fiber-locating structure, thereby forming a continuous passageway between the first face and the second face.

Some practices of the invention include forming the funnel portion by anisotropically etching the first face of the fiber-locating structure. This results in a pyramidal funnel portion. Other practices of the invention include forming the tunnel by deep reaction ion etching ("DRIE") the second face of the monolith. To better control the depths of the funnel and the tunnel, a stop layer can be incorporated into the interior of the fiber-locating structure. After etching to form a tunnel and a funnel on opposite sides of the stop layer, a portion of the stop layer separating the tunnel and the funnel is removed, thereby joining the tunnel to the funnel and forming a passageway between the first and second faces of the fiber-locating structure.

Additional practices of the invention include providing an optical fiber having a tapered end and inserting that tapered end into the funnel and through the tunnel. As the tapered end is inserted into the funnel, the walls of the funnel guide the tapered end into the tunnel.

In some cases, the mechanical strain at the point at which the fiber is supported introduces flaws into the fiber. To reduce the adverse effects of any flaws in the fiber, some practices of the invention include moving this contact point to a location in which it can easily be removed. One practice of the invention thus includes providing a scaffolding layer on the second face. This scaffolding layer extends part way into the tunnel, thereby forming a constricted transverse section within the tunnel. An optical fiber having a tapered end can then be inserted into the funnel and through the tunnel, until it is supported by the scaffolding layer within the constricted transverse section of the tunnel. After adhesively bonding the fiber to the walls forming the tunnel, the scaffolding layer is then removed and, optionally, a selected thickness of the second face of the monolith is also removed. This thickness is selected so that any flaw near the tip of the optical fiber is also removed.

This results in an optical fiber that is surrounded by the adhesive material and therefore less likely to be subjected to high local stresses.

In another practice of the invention, the scaffolding layer is a soft-metal layer. A tapered optical fiber is then inserted into the funnel and through the tunnel until its tapered end is seated against the soft-metal scaffolding layer. This soft-metal layer surrounds the optical fiber and constrains its movement while providing sufficient compliance to protect the optical fiber from excessive stresses arising from contact with the fiber-locating structure.

These and other features and advantages of the invention will be apparent from the following detailed description and the accompanying figures, in which:

DETAILED DESCRIPTION

Figure 1:
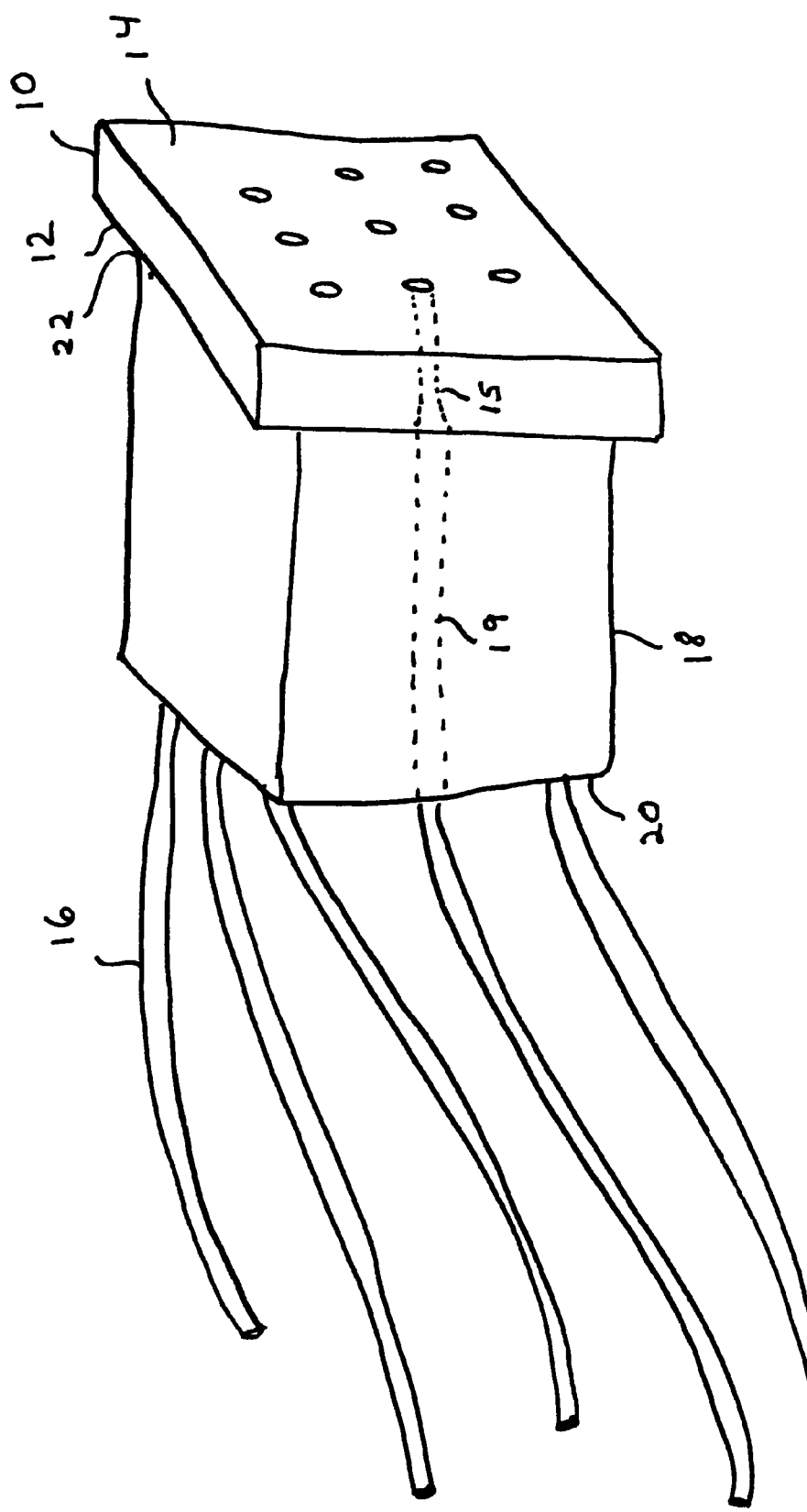
FIG. 1 shows an optical-fiber support structure having a monolithic substrate.

FIG. 1 shows a fiber-locating structure 10 having an input face 12 and an output face 14 opposite the input face 12. In some embodiments, the fiber-locating structure 10 is a monolithic substrate cut from a crystalline semiconductor wafer having a thickness in the range of 0.5–1 millimeters. In other embodiments, the fiber-locating structure 10 is formed by bonding two or more wafers together to form a composite substrate. The wafers can be bonded anodically, or by other known bonding processes. As used herein, the term "substrate 10" refers to either type of fiber-locating structure 10.

A plurality of passageways 15 traverse the substrate 10 from its input face 12 to its output face 14. Each passageway 15 is sized to enable an optical fiber to pass from the input face 12 of the substrate 10 to the output face 14 of the substrate 10.

A fiber support 18 is disposed proximate to the input face 12 of the substrate 10. The fiber support 18 is typically a ceramic structure having a corresponding plurality of passageways 19 extending from an input face 20 to an output face 22 thereof. Each passageway 19 in the fiber support 18 receives an optical fiber 16 and spreads the weight of that fiber 16 along a floor of the passageway 19. The fiber support 18 thus relieves stress that would otherwise be borne at a small section of fiber 16 within the substrate 10. This reduces the likelihood that a fiber 16 will gradually shift out of alignment after it is inserted into and bonded to the substrate 10.

Figure 2:
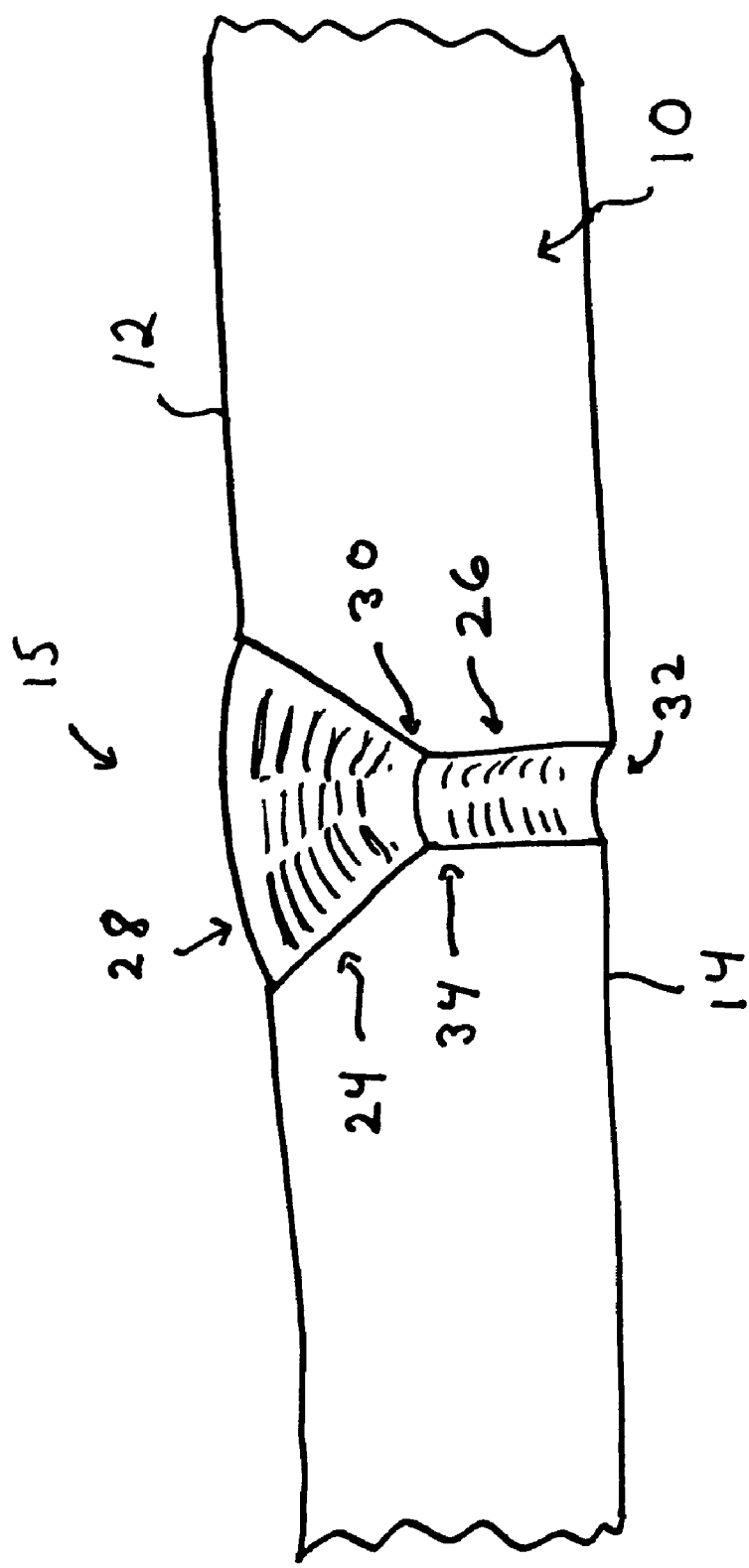
FIG. 2 is a cross-section of a passageway passing through the monolithic substrate of FIG. 1.

FIG. 2 shows a cross-section of a representative passageway 15 through the substrate 10. The passageway 15 includes a funnel portion 24 and a tunnel portion 26. The funnel portion 24 has a surface opening 28 at the input face 12 and extends inward from the input face 12 of the substrate 10 toward the output face 14 of the substrate 10. Before it reaches the output face 14 of the substrate 10, the funnel portion 24 terminates in an interior end 30. The tunnel portion 26 extends inward from a surface opening 32 on the output face 14 of the substrate 10 toward the input face 12 of the substrate 10. Before reaching the input face 12, the tunnel portion 26 terminates in an interior end 34. The funnel portion 24 and the tunnel portion 26 are aligned such that their respective interior ends 30, 34 meet in the interior of the substrate 10, thereby forming a passageway 15 from the input face 12 to the output face 14.

The funnel portion 24 of the passageway 15 is formed by an anisotropic KOH etch of the input face 12 of the semiconductor substrate 10. In one embodiment, KOH is used to etch a (001) silicon substrate. This results in a pyramidal funnel portion 24 having a rectangular cross-section. The angle of the pyramid depends on the crystalline structure of the semiconductor substrate 10. In the case of a 500 micron thick wafer, the opening of the funnel portion 24 at the input face 12 is approximately 530 microns, and the funnel portion 24 extends approximately 290 microns into the substrate 10.

The funnel portion 24 provides a visual and mechanical guide for the subsequent insertion of an optical fiber 16. In addition, the walls forming the funnel portion 24 guide adhesive into the gap between the walls forming the tunnel portion 26 and the optical fiber 16. This adhesive bonds the optical fiber 16 to the walls the tunnel portion 26.

The tunnel portion 26 is preferably made as long and narrow as possible. A long tunnel portion 26 increases surface area available for bonding the optical fiber 16, thereby reducing the likelihood of the optical fiber 16 shifting after bonding. A narrow tunnel portion 26 results in a smaller gap between the optical fiber 16 and the wall forming the tunnel portion 26. Preferably, the gap is on the order of one micron. The small gap results in an adhesive bond that better resists shear forces and that remains relatively stable even when exposed to extremes of temperature and humidity.

The tunnel portion 26 of the passageway 15 is formed by a DRIE (Deep Reaction Ion Etching) process. This results in a tunnel portion 26 having a relatively constant cross-section along its length. The diameter of the tunnel portion 26 is on the order of 115–120 microns. In the case of a 500 micron thick wafer, the tunnel portion 26 extends into the substrate 10 approximately 230 microns. By using photolithographic techniques to control the positions of holes to be etched by DRIE, the locations of the tunnel portions 26 can be accurately controlled.

Figure 3:
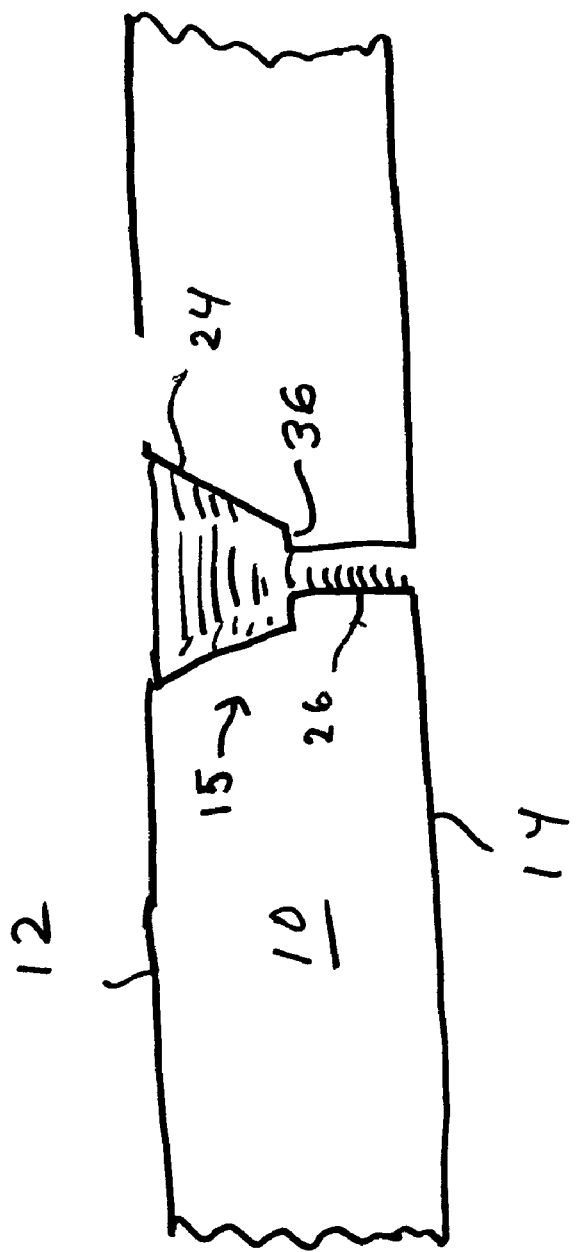
FIG. 3 is an alternate cross-section of a passageway passing through the monolithic substrate of FIG. 1.

In the passageway 15 shown in FIG. 2, the funnel portion 24 and the tunnel portion 26 of the passageway 15 merge smoothly into each other at their respective interior ends 30, 34. A disadvantage of this geometry arises from the difficulty in aligning the funnel portion 24 and the tunnel portion 26. This disadvantage is alleviated by having the interior end 34 of the tunnel portion 26 be smaller than the interior end 30 of the funnel portion 24, thereby forming a ledge 36, as shown in FIG. 3. The illustrated ledge 36 is large enough to allow some leeway in aligning the tunnel portion 26 and the funnel portion 24 of the passageway 15. However, the ledge 36 is also small enough to avoid interfering with the passage of the fiber 16 from the funnel portion 24 into the tunnel portion 26. A ledge 36 extending approximately 2 microns has been found to have these properties.

To fix the optical fiber 16 in the substrate 10, the passageway 15 is first filled with an adhesive material 44, such as epoxy. A tapered end 38 of an optical fiber 16 is then inserted into the funnel portion 24. The walls of the funnel portion 24 guide the tapered end 38 into the tunnel portion 26. The tapered end 38 penetrates the tunnel portion 26 until a transverse section of the optical fiber 16 having a diameter larger than the diameter of the tunnel portion 26 reaches the interior end 34 of the tunnel portion 26. When this occurs, the interior end 34 of the tunnel portion 26 engages the optical fiber 16, as shown in FIG. 5.

The tapered end 38 of the optical fiber 16 is formed by drawing the optical fiber 16 through an HF bath. To slow evaporation, and thereby maintain a constant concentration of HF, a layer of cyclohexane is floated on the surface of the HF bath. As the fiber 16 is drawn through the HF bath, those portions of the fiber that are in the bath the longest are etched away the most. This results in a gradual taper of the fiber 16. In the embodiment described herein, the taper angle is on the order of 0.1 degrees.

Figure 6:
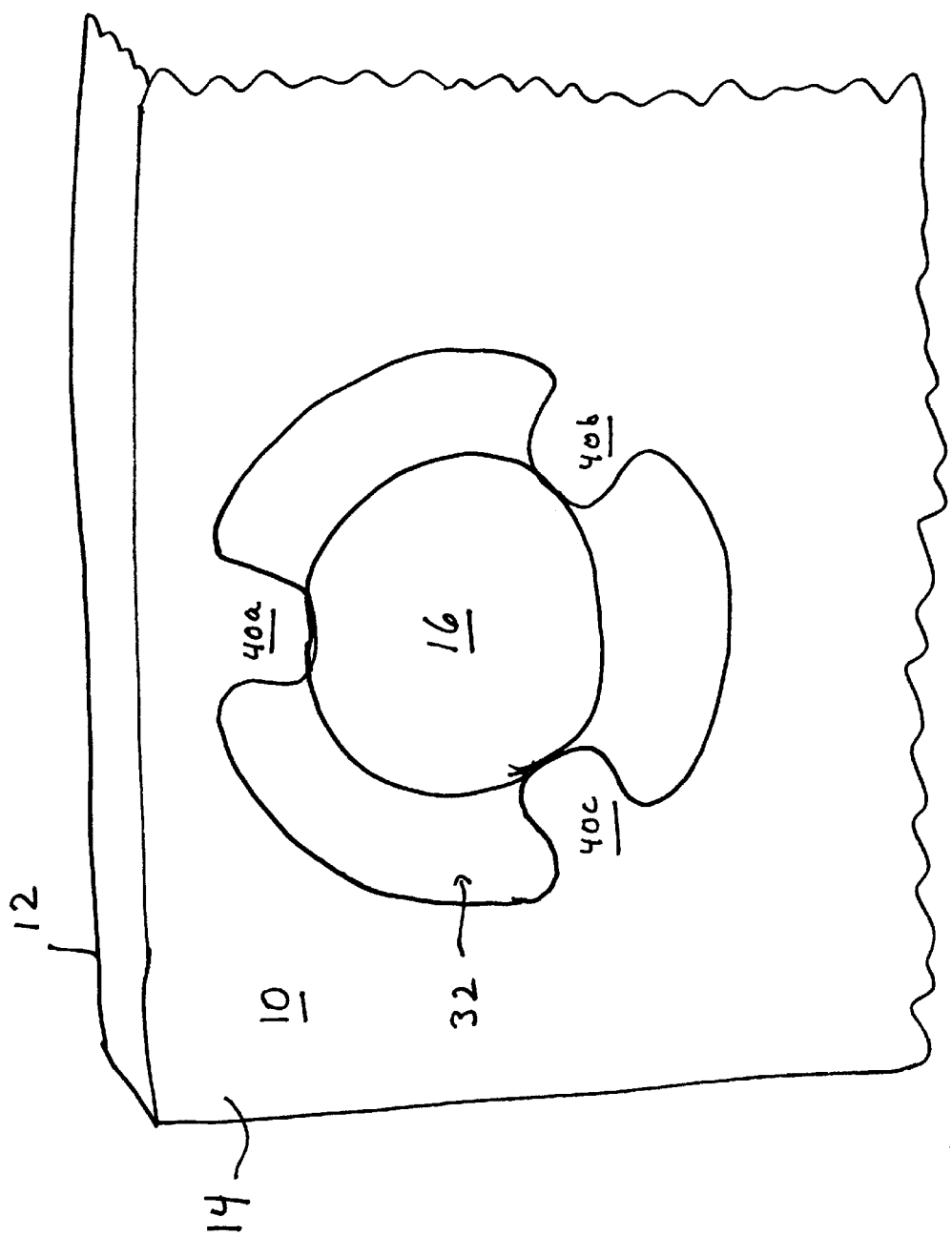
FIG. 6 is an end view of the monolithic substrate of FIG. 1, showing an optical fiber held in place by a kinematic mount.

In some embodiments, the cross-section of the tunnel portion 26 is circular. However, in other embodiments, the cross-section includes protrusions 40a–c that extend radially inward toward the center of the tunnel portion 26, as shown in FIG. 6. These protrusions 40a–c provide a kinematic mount for positioning the fiber 16 within the tunnel portion 26.

Figure 5:
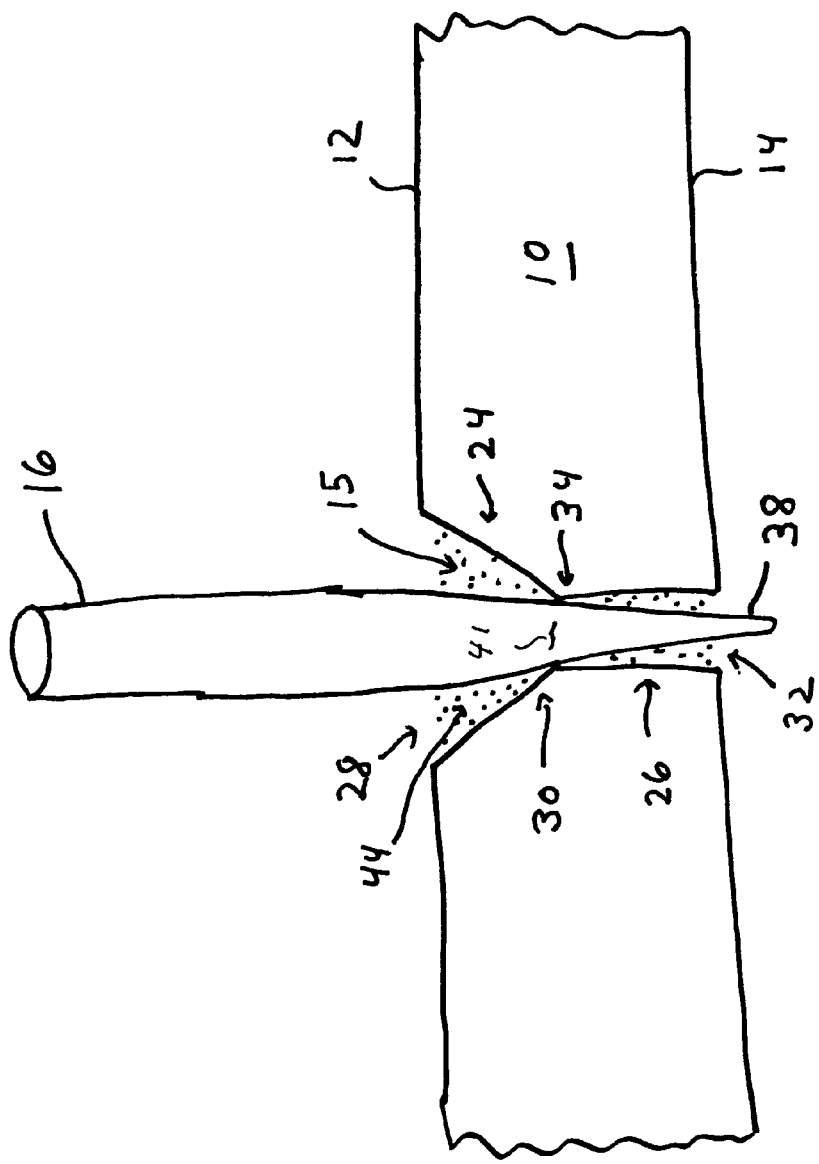
FIG. 5 is an optical fiber inserted into the passageway shown in FIG. 2.

In some environments, the configuration shown in FIG. 5 introduces a flaw 41 in the fiber 16 at the point of contact between the fiber 16 and the wall defining the interior end 34 of the tunnel portion 26. At the very least, such flaws can compromise the optical properties of the optical fiber 16. When sufficiently sever, such flaws can also lead to the eventual breakage of the optical fiber 16.

Figure 7:
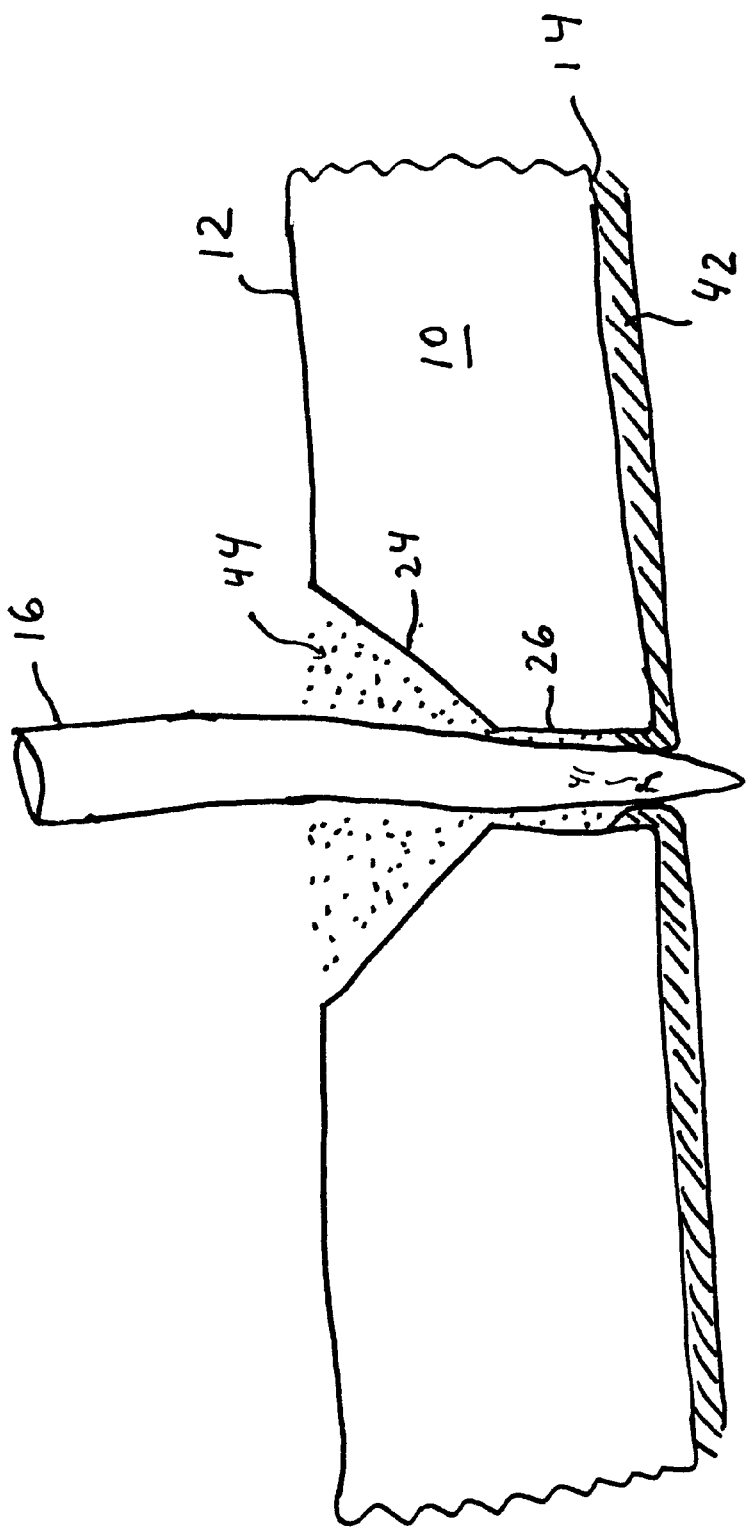
FIG. 7 is a cross-section of a substrate having a scaffolding layer that extends part way into the passageway.

In an alternative practice of the invention, the undesirable effects of a flaw 41 are avoided by depositing or precipitating a temporary scaffolding layer 42 on the output face 14 of the substrate 10, as shown in FIG. 7. This scaffolding layer 42 is typically a metal layer, on the order of 2 microns thick, that is electroplated onto the output face 14. As shown in FIG. 7, the scaffolding layer 42 extends part way into the tunnel portion 26.

Figure 4:
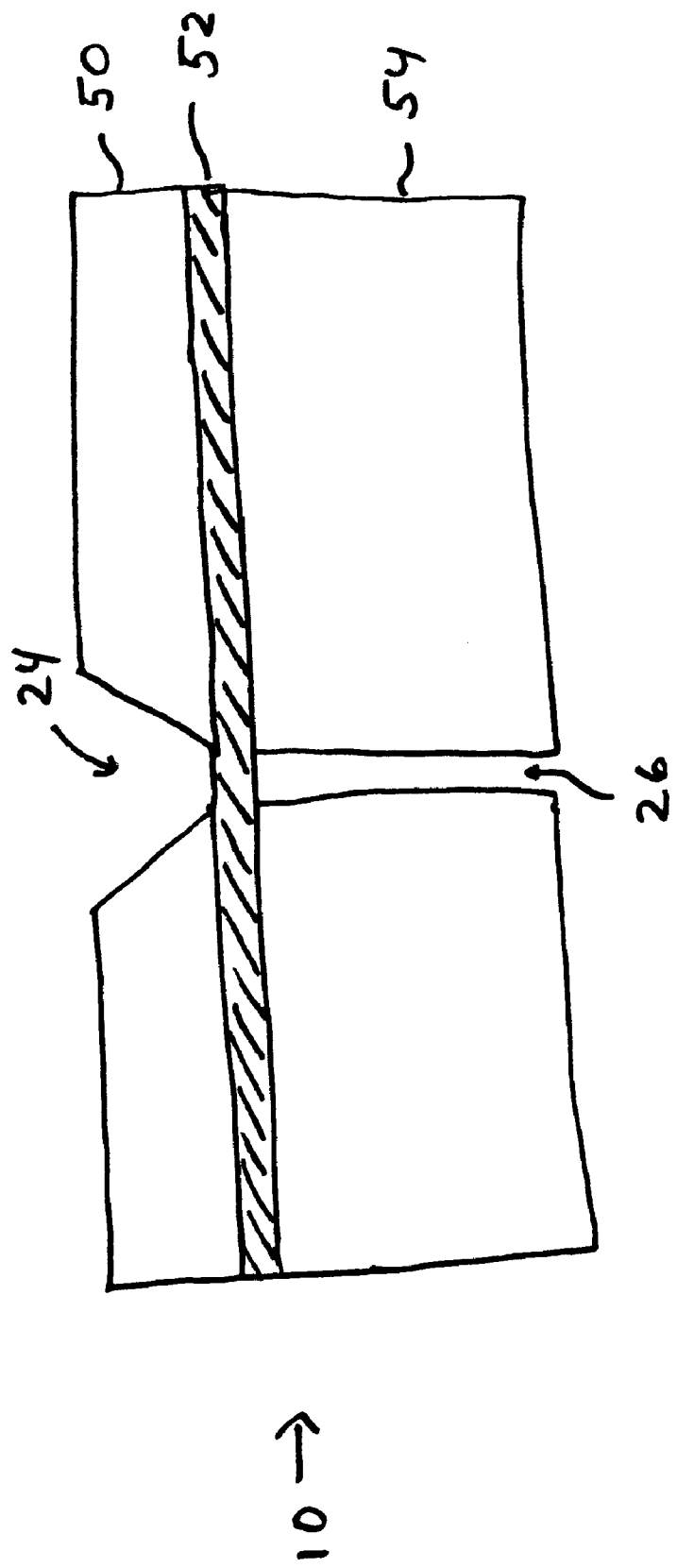
FIG. 4 shows a fiber-locating structure having an interior stop layer for controlling etch depth.

In manufacturing the substrate 10, it is important that the depths of the funnel portion 24 and of the tunnel portion 26 be precisely controlled. One method for achieving this is to form a substrate 10 by bonding a first layer 50 to a first side of a stop layer 52 and bonding a second layer 54 to a second side of the stop layer 52, as shown in FIG. 4. The stop layer 52 is made of a material that is relatively impervious to both KOH etching and DRIE. A suitable material for a stop layer 52 is silicon dioxide.

With a stop layer 52 present, the anisotropic KOH etch and the DRIE process both proceed until they each reach the stop layer 52. Then, an etchant removes the stop layer 52 separating the tunnel portion 26 and the funnel portion 24. This etchant is one that will remove the material of the stop layer 52 but has no effect on the first and second layers 50, 54.

To fix the optical fiber 16 in the substrate 10, the passageway 15 is first filled with an adhesive material 44, such as epoxy. The tapered end 38 of an optical fiber 16 is then inserted into the funnel portion 24. The walls of the funnel portion 24 then guide the tapered end 38 into the tunnel portion 26. The tapered end 38 penetrates the tunnel portion 26 until a transverse section of the optical fiber 16 having a diameter larger than the transverse section of the tunnel portion 26 constricted by the scaffolding layer 42 reaches that section. When this occurs, the scaffolding layer 42 engages the optical fiber 16, as shown in FIG. 7. The point at which the scaffolding layer 42 engages the optical fiber 16 is thus much closer to the output face 14 of the substrate 10 that it is in the configuration of FIG. 5.

Figure 8:
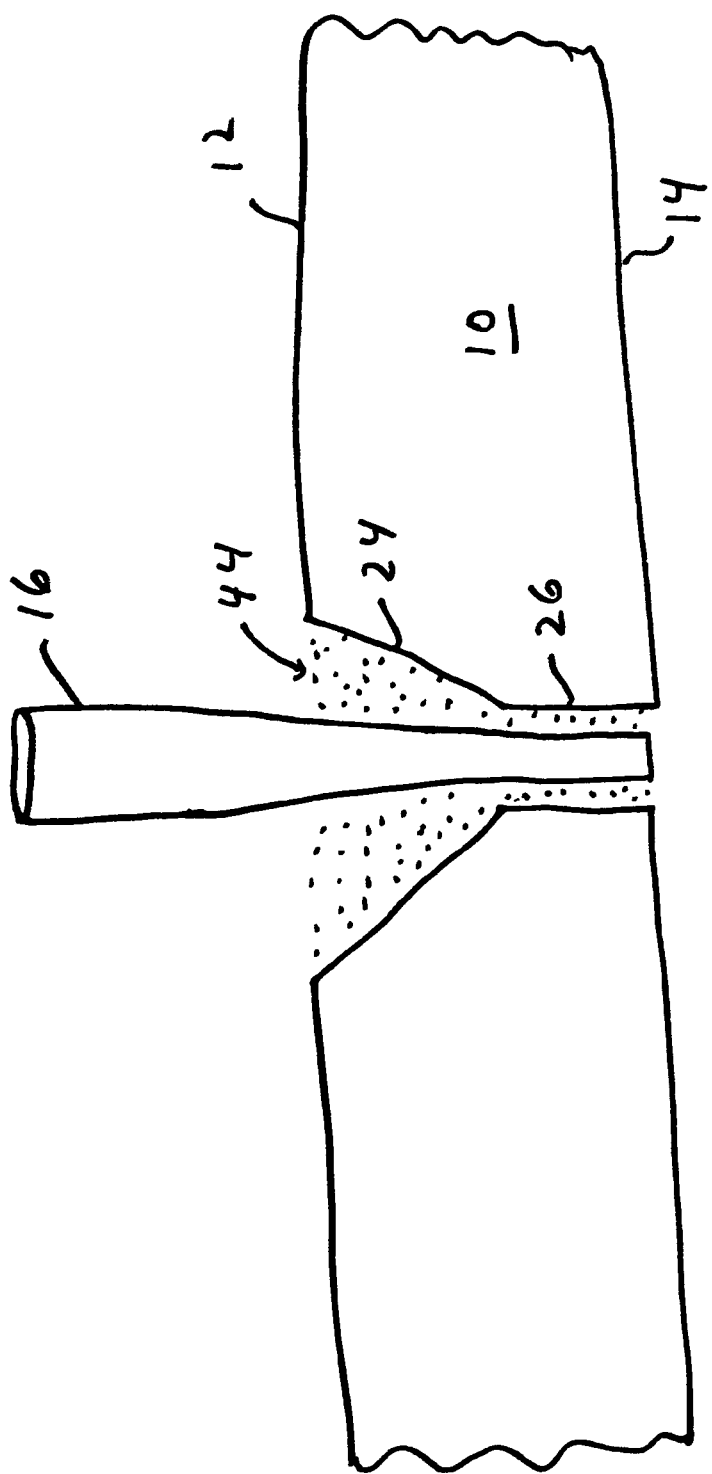
FIG. 8 is a cross-section of the passageway of FIG. 7 after removal of the scaffolding layer.

Once the adhesive material 44 has set, the scaffolding layer 42 is abraded off by a lapping disk. The lapping disk continues abrading past the scaffolding layer 42 and into the substrate 10. The substrate 10 is abraded to a depth that ensures removal of the portion of the fiber 16 that makes contact with the scaffolding layer 42, as shown in FIG. 8. The result of the abrasion process is an optical fiber 16 that is surrounded by a layer of adhesive material 44 and therefore not in contact with any portion of the walls defining the tunnel portion 26 and the funnel portion 24.

The configuration shown in FIG. 7, like that shown in FIG. 5, potentially introduces a flaw 41 in the optical fiber 16. Instead of being at the point of contact between the fiber 16 and the wall defining the interior end 34 of the tunnel portion 26, the portion of the fiber 16 that is most likely to become flawed is moved to the point of contact between the fiber 16 and the scaffolding layer 42. As is apparent from comparison of FIGS. 7 and 8, this point of contact is so close to the output face 14 of the substrate 10 that a flaw 41 near the point of contact can be removed by abrasion, as described above.

In some cases, an optical fiber 16 that is completely surrounded by an adhesive material 44 is prone to excessive movement. Such movement can arise because the adhesive material 44 experiences excessive strain in response to shear stresses to which it is subjected, or because of environmental conditions. For example, when the ambient air is too humid, the adhesive material 44 absorbs water and swells, thereby causing a small displacement of the optical fiber 16. When the temperature is too high or too low, the adhesive material 44 expands or contracts, again causing small but noticeable displacements of the optical fiber 16.

To alleviate these effects, one practice of the invention provides a scaffolding layer 42 made from a relatively soft-metal, such as gold. This results in a soft-metal layer filling the annular gap between the optical fiber 16 and the wall of the tunnel portion 26. The abrasive process described above is then halted before it removes the soft-metal layer within this annular gap.

The soft-metal layer is more compliant than the material from which the substrate 10 is made. As a result, the optical fiber 16 supported by this soft-metal layer is not subjected to stresses as great as those that would result from contact with the substrate itself 10. Compared to many adhesive materials, this soft-metal layer is less prone to change in response to changing environmental conditions. As a result, under some circumstances, the soft-metal layer restricts the motion of the optical fiber 16 more effectively than does a layer made of an adhesive material 44.

Having described the invention, and a preferred embodiment thereof, what we claim as new, and secured by letters patent is:

1. An article of manufacture comprising:
    a fiber-locating structure having
        a first face;
        a second face opposite said first face;
        a first wall defining a funnel extending from said first face toward said second face; and
        a second wall defining a tunnel extending from said second face toward said first face;
    said first and second walls being disposed such that said funnel and said tunnel meet to form a continuous passageway between said first face and said second face,
    wherein said fiber-locating structure comprises:
        a stop layer having a first face and a second face opposed to said first face;
        a first layer bonded to said first face of said stop layer; and
        a second layer bonded to said second face of said stop layer.

2. The article of claim 1, wherein said second wall defines a tunnel having a circular cross-section.

3. The article of claim 1, wherein said second wall defines a tunnel having a cross-section in which a plurality of protrusions extend radially inward toward a center of said tunnel.

4. The article of claim 1, wherein said first and second walls define a ledge between said funnel and said tunnel.

5. The article of claim 1, wherein said first wall defines a pyramidal funnel.

6. The article of claim 1, wherein said first wall defines a funnel having a rectangular cross-section.

7. The article of claim 1, further comprising an optical fiber extending from said first face to said second face through said funnel and said tunnel.

8. The article of claim 7, wherein said optical fiber is a tapered optical fiber.

9. The article of claim 7, further comprising a support proximate to said first face, said support disposed to support said optical fiber.

10. The article of claim 1, wherein said fiber-locating structure comprises a plurality of first and second walls defining a corresponding plurality of funnels and corresponding tunnels, each of said first and second walls being disposed such that said funnel and a tunnel corresponding to said funnel form a continuous passageway between said first face and said second face.

11. The article of claim 1, further comprising a scaffolding layer disposed on said second face, said scaffolding layer including a support portion extending from said second face to cover a portion of said second wall forming said tunnel.

12. The article of claim 11, wherein said scaffolding layer comprises a soft-metal layer.

13. The article of claim 1, wherein said fiber-locating structure is a monolithic structure.

14. The article of claim 1, wherein said fiber-locating structure comprises a first layer and a second layer bonded to each other.

15. A method of aligning an optical fiber, said method comprising:
   providing a fiber-locating structure having a first face and a second face;
   forming a funnel in said fiber-locating structure, said funnel extending from said first face toward said second face; and
   forming a tunnel extending from said second face toward said first face, said tunnel intersecting said funnel to form a continuous passageway between said first face and said second face,
   wherein providing said fiber-locating structure comprises:
      providing a stop layer having a first side and a second side opposed to said first side,
      providing a first layer bonded to said first side of said stop layer, and
      providing a second layer bonded to said second side of said stop layer.

16. The method of claim 15, wherein providing a fiber-locating structure comprises providing a semiconductor substrate.

17. The method of claim 15, wherein forming a funnel comprises anisotropically etching said first face of said fiber-locating structure.

18. The method of claim 15, wherein forming a tunnel comprises deep reaction ion etching said second face.

19. The method of claim 15, wherein:
   forming a tunnel comprises etching through said first layer to expose said first face of said stop layer,
   forming a funnel comprises etching through said second layer to expose said second face of said stop layer.

20. The method of claim 19, further comprising:
   etching through said stop layer to join said tunnel to said funnel.

21. The method of claim 15, further comprising:
   providing an optical fiber having tapered end, and
   inserting said tapered end of said optical fiber into said funnel and through said tunnel.

22. The method of claim 21, further comprising bonding said tapered end of said optical fiber to said fiber-locating structure.

23. The method of claim 15, further comprising providing a scaffolding layer on said second face, said scaffolding layer extending part-way into said tunnel.

24. The method of claim 23, further comprising:
   providing an optical fiber having a tapered end; inserting said tapered end into said funnel and through said tunnel; and
   supporting said tapered end at said scaffolding layer.

25. The method of claim 24, further comprising:
   bonding said tapered end to said fiber-locating structure, and
   removing said scaffolding layer.

26. The method of claim 25, further comprising removing a selected thickness of said second face of said fiber-locating structure.

27. The method of claim 15, wherein forming a tunnel comprises selecting a cross-section of said tunnel to be circular.

28. The method of claim 15, wherein forming a tunnel comprises selecting a cross-section of said tunnel to include a plurality of radially extending protrusions for fixing a location of said optical fiber in said tunnel.

29. An article of manufacture comprising:
   a fiber-locating structure having
      a first face;
      a second face opposite said first face;
      a first wall defining a funnel extending from said first face toward said second face; and
      a second wall defining a tunnel extending from said second face toward said first face;
   said first and second walls being disposed such that said funnel and said tunnel meet to form a continuous passageway between said first face and said second face,
   wherein said second wall defines a tunnel having a cross-section in which a plurality of protrusions extend radially inward toward a center of said tunnel.

30. A method of aligning an optical fiber, said method comprising:
   providing a fiber-locating structure having a first face and a second face;
   forming a funnel in said fiber-locating structure, said funnel extending from said first face toward said second face; and
   forming a tunnel extending from said second face toward said first face, said tunnel intersecting said funnel to form a continuous passageway between said first face and said second face,
   wherein forming a tunnel comprises selecting a cross-section of said tunnel to include a plurality of radially extending protrusions for fixing a location of said optical fiber in said tunnel.

* * * * *